United States Patent
Garrett et al.

(10) Patent No.: US 9,963,623 B2
(45) Date of Patent: May 8, 2018

(54) FLUID RESISTANT, HIGH PERFORMANCE REACTIVE HOT MELT SEALANT AND/OR ADHESIVE COMPOSITIONS

(71) Applicant: LUNA INNOVATIONS INCORPORATED, Roanoke, VA (US)

(72) Inventors: James Thomas Garrett, Gordonsville, VA (US); Robert James Klein, Lebanon, OH (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 98 days.

(21) Appl. No.: 15/026,743

(22) PCT Filed: Oct. 3, 2014

(86) PCT No.: PCT/US2014/058969
§ 371 (c)(1),
(2) Date: Apr. 1, 2016

(87) PCT Pub. No.: WO2015/102699
PCT Pub. Date: Jul. 9, 2015

(65) Prior Publication Data
US 2016/0251553 A1  Sep. 1, 2016

Related U.S. Application Data

(60) Provisional application No. 61/887,000, filed on Oct. 4, 2013.

(51) Int. Cl.
| | |
|---|---|
| C08G 18/12 | (2006.01) |
| C08G 18/40 | (2006.01) |
| C08G 18/42 | (2006.01) |
| C08G 18/50 | (2006.01) |
| C08G 18/72 | (2006.01) |
| C08G 18/76 | (2006.01) |
| C08G 18/79 | (2006.01) |
| C08K 5/10 | (2006.01) |
| C09J 11/04 | (2006.01) |
| C09J 175/04 | (2006.01) |
| C09J 175/08 | (2006.01) |
| C08K 3/00 | (2018.01) |
| C09J 7/02 | (2006.01) |

(52) U.S. Cl.
CPC ............ *C09J 175/08* (2013.01); *C08G 18/12* (2013.01); *C08G 18/4018* (2013.01); *C08G 18/42* (2013.01); *C08G 18/5015* (2013.01); *C08G 18/724* (2013.01); *C08G 18/7671* (2013.01); *C08G 18/792* (2013.01); *C08K 3/0033* (2013.01); *C08K 5/10* (2013.01); *C09J 7/02* (2013.01); *C09J 11/04* (2013.01); *C09J 175/04* (2013.01); *C08G 2170/20* (2013.01); *C08G 2190/00* (2013.01)

(58) Field of Classification Search
CPC ............... C08G 18/12; C08G 18/5015; C08G 18/4018; C08G 18/42; C08G 18/724; C08G 18/7671; C08G 18/792; C08G 2170/20; C08G 2190/00; C08K 3/0033; C08K 5/10; C09J 175/04; C09J 175/08; C09J 7/02; C09J 11/04
See application file for complete search history.

(56) References Cited

U.S. PATENT DOCUMENTS

| | | | |
|---|---|---|---|
| 5,026,814 A * | 6/1991 | Re | C08G 18/10 428/844.7 |
| 5,367,036 A | 11/1994 | Saito et al. | |
| 5,543,200 A | 8/1996 | Hargis et al. | |
| 5,648,447 A | 7/1997 | Seneker et al. | |
| 6,087,463 A | 7/2000 | Tada et al. | |
| 9,670,391 B2 * | 6/2017 | Kanagawa | C09J 175/06 |
| 2004/0180155 A1 | 9/2004 | Nguyen-Misra et al. | |
| 2007/0032625 A1 * | 2/2007 | Roesler | C08G 18/10 528/44 |

FOREIGN PATENT DOCUMENTS

| | | | |
|---|---|---|---|
| EP | 0525795 | 7/1992 | |
| EP | 1251145 | 10/2002 | |
| WO | WO 2013/061790 | * 5/2013 | ............ C09J 175/04 |

OTHER PUBLICATIONS

EP Appln. No. 14877169.4, Extended Search Report (Apr. 21, 2017).
International Search Report for PCT/US2014/058969, dated Jun. 29, 2015, 6 pages.
Written Opinion of the ISA for PCT/US2014/058969, dated Jun. 29, 2015, 6 pages.

* cited by examiner

*Primary Examiner* — Patrick D Niland
(74) *Attorney, Agent, or Firm* — Nixon & Vanderhye P.C.

(57) ABSTRACT

A reactive hot melt (RHM) composition is provided as a mixture of a urethane prepolymer which is a reaction product of at least one crystallizable polyol, a perfluoropolyether polyol, and at least one isocyanate, a filler material, and a teachable plasticizer consisting of an aliphatic ester of a carboxylic acid.

20 Claims, No Drawings

FLUID RESISTANT, HIGH PERFORMANCE REACTIVE HOT MELT SEALANT AND/OR ADHESIVE COMPOSITIONS

CROSS-REFERENCE TO RELATED APPLICATIONS

This application is the U.S. national phase of International Application No. PCT/US2014/058969 filed Oct. 3, 2014, which designated the U.S. and claims domestic priority benefits under 35 USC § 119(e) from U.S. Provisional Patent Application Ser. No. 61/887,000 filed on Oct. 4, 2013, the entire contents of each of which are expressly incorporated hereinto by reference.

GOVERNMENT RIGHTS

This invention was made with Government support under Contract Nos. FA8650-08-M-5605 and FA8650-10-C-5154 awarded by the Department of the Air Force. The Government has certain rights to the invention.

FIELD

The disclosed embodiments herein relate generally to novel reactive hot melt compositions having utility as sealants, adhesives, and/or elastomers, especially in the aerospace industry.

BACKGROUND AND SUMMARY

For aerospace applications, compositions serving as sealants and/or adhesives must possess excellent fluid resistance to a variety of fluids, including jet fuel, de-icing fluid, water, hydraulic oil, lubricating oil, and the like. Compositions must also provide excellent post-cure mechanical properties, such as high flexibility.

In addition, many compositions employed as sealants and/or adhesives must be able to be applied rapidly, with minimal man-hour and material costs, and cure without dimensional changes into a multifunctional material. Rapid application is assisted by low melting temperature and relatively low melt viscosity in a pre-cured state. In addition to fluid resistance and flexibility, post-cure performance requirements include excellent adhesion to aluminum, titanium, carbon fiber-epoxy composite, and primed and/or promoted surfaces; adhesion, mechanical strength, and dimensional stability over a wide temperature range and appropriate surface tension properties for top-coating.

Existing adhesive or sealant materials that offer similar post-cure performance include variants such as two-component (2K) flexibilized epoxies; 2K or three component (3K) polysiloxanes; 2K polysulfides or polythioethers or thermoplastic polyurethanes that are melted into place. However, epoxies, polysiloxanes, and polysulfides/thioethers all suffer from the drawbacks of 2K systems, namely extra time to mix components, mixing inconsistencies (inconsistent ratios, material degradation, and entrapped air), short pot life, and long cure time. The thermoplastic polyurethanes and similar melt-in-place thermoplastics suffer from lengthy application time and high application temperatures during the melting process, poor adhesion, and low post-application maximum operating temperatures.

It would therefore be highly desirable to achieve a sealant or adhesive material with easy application and handling while in a pre-cured state which possesses excellent fluid resistance, dimensional stability, and adhesion to a variety of surfaces in a post-cured state. It is towards meeting this need that the embodiments as disclosed herein are directed.

In general, the compositions as disclosed herein are in the form of a reactive hot melt (RHM) adhesive which includes a urethane prepolymer containing a flexible polyol, a crystallizable polyol, a high hard segment content, a filler package, a leachable plasticizer and, optionally additives. Prior to cure, the urethane prepolymer exhibits a low melting point and a melt viscosity suitable for application. During the cure process, the isocyanate groups exhibit excellent bond strength to a variety of surfaces. Once cured with exposure to moisture, the RHM adhesive material retains adhesion, shape, and density, even after exposure to polar and non-polar solvents including water, deicing fluid, hydraulic oil, JP-8, and lubricating fluids.

As an additional step, the RHM adhesive material may be mixed with a hydroxyl and/or amine functional hardener to create an elastomer. Except for adhesion to a surface, which will be modified depending on the crosslinker and the application process, all post-cure properties (fluid resistance, elasticity, etc.) are retained or enhanced by crosslinking the isocyanate groups with hydroxyl and/or amine groups. Cure proceeds immediately upon mixing with the hardener.

According to embodiments disclosed herein a reactive hot melt (RHM) composition is provided as a mixture of a urethane prepolymer which is a reaction product of at least one polyol and at least one isocyanate, a filler material, and a leachable plasticizer consisting of an aliphatic ester of a carboxylic acid.

In some embodiments, the at least one isocyanate is selected from the group consisting of hexamethylene diisocyanate (HDI), methylenediphenyl diisocyanate (MDI), toluene diisocyanate (TDI), isophorone diisocyanate (IPDI) and hydrogenated methylenediphenyl diisocyanate (hMDI). Certain embodiments will employ a mixture of hexamethylene diisocyanate (HDI) and methylenediphenyl diisocyanate (MDI) in about a 1:1 weight ratio.

The at least one polyol is selected from the group consisting of polyester polyols, polyethylene copolymer polyols, polysiloxane polyols and acrylic polyols.

The filler material may be least one fibrous or particulate filler selected from the group consisting of silica, carbon or metallic filler materials. As exemplary, the filler material may be at least one selected from the group consisting of nickel, iron, aluminum, tungsten, silver, gold, platinum, palladium and carbon materials. The filler material may be employed in an amount between about 0.1 wt. % to about 80 wt. %, based on total composition weight.

According to some embodiments, the leachable plasticizer consists of an aliphatic ester of citric acid, malonic acid and/or phthalic acid. Examples of such plasticizers include triethyl citrate, tributyl acetylcitrate and diethyl malonate. A non-ionic miscibilizer may optionally be employed, such as ethylenediamine tetrakis(propoxylate-block-ethoxylate) tetrol (EDTP-b-ET) and poly(ethylene glycol) sorbitol hexaoleate (PEGSH). The leachable plasticizer may be present in an amount between about 1.0 wt % to about 40 wt. %.

An additive other than the filler material may be employed in other embodiments in an amount about 0.1 wt. % to about 80 wt. %. Such other optional additive may be one selected from the group consisting of density modifiers, dispersion additives, blocking agents, air reducing additives, antioxidants, flow improvers, conductivity modifiers and cure rate accelerators.

The RHM composition may be made by (a) forming a urethane prepolymer by reacting at least one polyol and at least one isocyanate, and thereafter (b) mixing the urethane prepolymer with (i) a filler material and (ii) a leachable plasticizer consisting of an aliphatic ester of a carboxylic acid.

These and other aspects of the present invention will become more clear after careful consideration is given to the following detailed description of a presently preferred exemplary embodiment thereof.

DETAILED DESCRIPTION

As noted briefly above, the RHM adhesive compositions according to the embodiments disclosed herein will necessarily include a urethane prepolymer, a filler package and a leachable plasticizer. Additives conventionally employed in hot melt adhesive compositions may also be included in suitable amounts.

The RHM adhesive compositions according to the embodiments disclosed herein offer several benefits over the existing 2K and thermoplastics options, including (1) as a 1K material, it is completely pre-mixed and no mixing by the operator is needed; (2) a low melting temperature of the RHM composition in the uncured state leads to rapid application due to low melting temperature; (3) lower-temperature tooling is needed to apply the RHM; within 5-20 seconds after application, the material cools and viscosity increases, and thereby leads to very rapid green strength, shape-retention, and adhesion with minimal slump; (4) in the green state, the material cures over time with exposure to moisture, which allows for rework over a limited period of time; (5) in the green state, the reactive groups adhere very well to any oxygen- or nitrogen-containing groups on the surface, leading to excellent adhesion to metals, nearly all polymers, and any primers or undercoats; and (6) once fully cured, the material is highly thermally stable, leading to a high maximum operating temperature.

There are three major drawbacks to RHM compositions, including (1) prior to application, any moisture exposure will degrade pot life significantly; (2) moisture-cure generates byproducts of some type (in most cases $CO_2$, but may include ethanol, aldehydes, or other small molecules), and if filler loading is not high enough, cure rate is too rapid, and/or the material is applied too thick, bubbles can form within the material due to the generation of $CO_2$ or other byproducts; and (3) the material cures from the outside-in and cure is limited by moisture diffusion, and therefore may require several hours to achieve 90% of mechanical strength and adhesion depending on the thickness.

For the disclosed RHM compositions herein, all three of these drawbacks are accounted for by appropriate containers, high filler loading, balanced cure rate, and sufficient cure time. Specifically, pot life is extended by packaging in aluminum containers with small orifices, aluminum-backed plastic that is heat sealed, or other appropriate packaging. Significant $CO_2$ generation occurs during the cure of the RHM technology, but the formation of bubbles is minimized by (a) reducing the cure rate by using a controlled level of catalyst and the presence of a blocking agent such as diethyl malonate, (b) reducing cure rate by using an appropriate proportion of highly reactive isocyanate such as MDI and less reactive isocyanate such as HDI, (c) by increasing the filler loading such that a high modulus prevents the formation of large bubbles and instead encourages diffusion through the film, and (d) by casting thin films which favors diffusion through the film rather than internal bubble formation. In terms of moisture cure, there is no simple way to avoid moisture cure from the outside layer in, but the casting of thin films does reduce overall cure time.

There are many other RHM technologies that have been disclosed previously in the literature. A comparison of disclosed RHM technology to existing commercial RHM adhesives, the disclosed technology offers lower viscosity for the same filler loading level, higher resistance to bubbling during cure, significantly better fluid resistance for both polar and non-polar fluids, excellent green-strength adhesion due to the high polyester content, and significantly better retention of electrical properties after fluid immersion due to the inherent solvent resistance and the leachable plasticizer. Additionally, the disclosed compositions offer significantly reduced hazards by minimizing volatile isocyanates in the pre-cure state, using very low hazard additives and plasticizer, and only generating $CO_2$ (rather than e.g., ethanol or aldehydes) during the cure process.

A. Urethane Prepolymer

The urethane prepolymer component according to certain embodiments herein may be comprised of a hexamethylene diisocyanate (HDI) trimer and a methylene diisocyanate (MDI) in about equal parts by weight, a crystallizable copolyester polyol, a chain extender such as 1,4-butanediol, and a perfluoropolyether polyol may satisfactorily be employed in the composition.

The isocyanates in the urethane prepolymer may alternatively or additionally include other isocyanates, such as toluene diisocyanate (TDI), isophorone diisocyanate (IPDI), or hydrogenated MDI (hMDI), provided that the reactivity and intermolecular bonding is controlled appropriately. Aliphatic isocyanates will offer improved resistance to light-induced degradation.

Crystallizable polyols, such as polyethylene copolymer polyols, polysiloxane polyols, or acrylic polyols, may be included in addition or as an alternative to the copolyester polyol provided that the viscosity and crystallization speed are not adversely affected.

Perfluoropolyether (PFPE) polyols having a weight average molecular weight of between about 250 to about 2,500 may be employed satisfactorily. A variety of PFPE polyols may be used, for example, those described in U.S. Pat. No. 8,410,202 (the entire content of which is expressly incorporated hereinto by reference) may be employed in amounts ranging from about 0.5 to about 30 wt. %, typically between about 1 to about 2 wt. %, based on total composition weight.

Multi-functional alcohol- or amine-terminated chain extenders in addition or as an alternative to 1,4-butanediol may be employed.

Soft segment polyols such as polyalkylene (e.g., polypropylene) glycols, polysulfide polyols, silicone polyols, and the like may be used in addition to perfluoropolyether polyol so as to achieve higher elongation-at-break. Inclusion of such other soft segment polyols will, however, have a tendency to exhibit a negative impact on the fluid resistance of the composition.

Other reactive groups may be introduced into the prepolymer so as to modify the prepolymer end-group and/or crosslinking reaction, such as aminosilanes, phenol blocking agents, diamine generating molecules, and the like.

According to some embodiments, the prepolymer may be used as a one-component, moisture-induced-cure adhesive. However, if multi-functional alcohols or amines are added as a secondary component, the prepolymer may be used in a two-component adhesive that cures upon mixing.

The urethane prepolymer is preferably present in the composition in amounts between about 15 wt. % to about 95 wt. % based on total composition weight. Advantageously, the urethane prepolymer may be present in an amount between about 25 wt. % to about 70 wt. %, based on total composition weight.

B. Filler

Virtually any filler material may be incorporated to provide multi-functional properties. Filler material is used to modify mechanical, rheological, thermal, electrical, cost-basis, or other properties. For example, carbon black provides increased mechanical modulus and strength, higher viscosity and lower slump, and low levels of conductivity. Other fillers may include silica, fumed silica, chopped carbon fiber, nickel flake, etc. Chopped carbon fiber and nickel flake will provide moderate electrical and thermal conductivity to the mixture. For thermal and electrical conductivity, other suitable conductive fillers may be composed of nickel, iron, aluminum, tungsten, silver, gold, platinum, palladium, carbon (graphite, graphene, carbon fiber, carbon nanofiber, carbon black, carbon nanotubes), and coated or alloyed fillers that include any of these elements.

The filler material will be employed in amounts sufficient to provide the desired mechanical, rheological, thermal, electrical, cost-basis, or other properties to the compositions. According to some embodiments, the filler material is preferably present in the composition in amounts between about 0.1 wt. % to about 80 wt. %, based on total composition weight. Advantageously, the filler material may be present in an amount between about 20 wt % to about 75 wt. %, based on total composition weight.

C. Leachable Plasticizer

At least one leachable plasticizer is also present in the reactive hot melt compositions so as to compensate for swelling that may occur when the cured composition is brought into contact with polar and/or non-polar fluids. That is, the leachable plasticizer or blends of leachable plasticizers are provided in the composition so as to achieve a substantially net zero volume swell of the composition when contacted with polar and/or non-polar fluids (i.e., due to the plasticizer leaching from the composition due to the presence of the fluid). Preferred plasticizers include aliphatic esters of carboxylic acids, such as aliphatic esters of citric acid, malonic acid and/or phthalic acid. Especially preferred plasticizers include triethyl citrate, tributyl acetylcitrate and diethyl malonate. The selection of any particular plasticizer or blends of plasticizers may have an effect on the mass gain and volume swell after fluid exposure, mechanical properties, and volatility.

A non-ionic miscibilizer may also be present so as to improve the "leachability" of the plasticizer, such as ethylenediamine tetrakis(propoxylate-block-ethoxylate) tetrol (EDTP-b-ET) or poly(ethylene glycol) sorbitol hexaoleate (PEGSH). Other miscibilizing agents may additionally be used to reduce mass gain and volume swell after immersion in various fluids and improve mechanical or electrical properties, provided that they are not reactive with the isocyanate or similar prepolymer reactive groups.

D. Other Additives

Virtually any conventional additives, catalysts, and/or blocking agents that are known in the art to modify density, dispersion, conductivity, and cure rate of adhesive compositions may be employed in the RHM compositions disclosed herein. If employed, such additives may be present in the compositions in an amount up to about 20 wt. %, for example between 2 wt. % to about 5 wt. %, based on total composition weight.

The following Table provides exemplary approximate weight percentage ranges (based on total composition weight) of the compositional components that may be employed according to certain embodiments described herein:

Ranges of Composition:

| Component | Low (wt %) | Preferable (wt %) | High (wt %) |
|---|---|---|---|
| Hexamethylene diisocyanate (HDI) trimer or similar lower-reactivity isocyanate(s) | 1.0 | 4.0-5.0 | 30.0 |
| Methylenediphenyl diisocyanate (MDI) trimer or similar higher-reactivity isocyanate(s) | 1.0 | 4.0-5.0 | 30.0 |
| Crystallizable copolyester polyol or similar crystallizable polyol(s) | 7.5 | 10-12 | 60.0 |
| Perfluoropolyether polyol or similar soft-segment polyol(s) | 0.5 | 1-2 | 30.0 |
| Butanediol or similar chain extender(s) | .01 | 0.5-0.8 | 8.0 |
| Catalyst(s) | 0.001 | 0.005-0.05 | 1.0 |
| Filler(s) | 0.1 | 20-75 | 80 |
| Air reducing additive(s) | 0 | 0.1-0.5 | 2 |
| Blocking agent additive(s) | 0 | 0.5-1.5 | 5 |
| Dispersing additive(s) | 0 | 0.5-1 | 2 |
| Leachable Plasticizer(s) | 1.0 | 3.0-6.0 | 40.0 |
| Antioxidant(s) | 0 | 0-0.5 | 2 |
| Miscibilizer(s) | 0 | 0.1-0.5 | 2 |

EXAMPLES

Example 1

The following components were employed in this synthesis example:

DESMODUR® N3300 (hexadiisocyanate (HDI) trimer), source=Bayer Materials Science, 19.5 wt %

RUBINATE® 9433 (liquefied diphenylmethane diisocyanate (MDI)), source=Huntsman Polyurethanes, 19.4 wt %

DYNACOLL® 7360 (4000 g/mol co-polyester linear polyol), source=Evonik Industries, 51.9 wt %

FLUOROLINK® E10-H (~1500 g/mol fluorinated linear polyether polyol), source=Solvay Solexis, 6.1 wt %

1,4-butanediol, 3.1 wt %

Dibutyl tin dilaurate (DBTDL), 0.10 wt %

182.8 g of DYNACOLL® 7360 copolyester polyol (Evonik Industries) and 21.5 g of FLUOROLINK® E10-H dialcohol terminated, ethoxylated perfluoropolyether (Solvay Solexis Sp.A) were added to a 1 L glass reactor that had been dried overnight. The DYNACOLL® 7360 copolyester and FLUOROLINK® E10-H perfluoropolyether were heated under 25 psig vacuum at 120-130° C. for 2 hours and constant mixing with an overhead paddle mixer. The reactor was then cooled to 70° C., vacuum was removed, and positive pressure nitrogen purge was introduced. 71.2 g of DESMODUR® N3300 aliphatic polyisocyanate (HDI timer, Bayer Material Science) and 71.6 g of RUBINATE® 9433 isocyanate (Huntsman Polyurethanes) were charged into the reactor, decreasing the temperature to ~65° C. 0.352 g of dibutyltin dilaurate (Sigma Aldrich) was added to the reactor, and the resulting endotherm heated the mixture to ~75° C. and also increased the viscosity. The reaction mixture was allowed to react for 1 hour while mixing at 60-70° C. 10.8 g of 1,4-butanediol (Sigma Aldrich) was added dripwise to the reactor, while mixing continued, through an addition funnel, at a rate of 1 drop every 3-5 s. This was allowed to react for 30 min, following which 14.8 g of diethyl malonate (Sigma Aldrich) was added to the reactor, allowed to mix in for 3 minutes while under nitrogen purge. The resin reaction product in the reactor was thereafter poured into dried moisture-tight containers.

This resin reaction product was then formulated with several other components, using a planetary mixer (Flakteck Speedmixer) to achieve mixing. 8.0 g of the obtained resin reaction product was added to a small Flakteck cup, followed by 0.356 g of chopped carbon fiber (Electronic Fiber Technologies), 0.110 g of BYK®-A 535 defoamer (Byk Additives), 0.286 g of BYK® 410 liquid reheology additive (Byk Additives), 1.437 g of TEC acrylic additive, and 0.180 g of poly(ethylene glycol) sorbitol hexaoleate (PEGSH, Sigma Aldrich). Prior to mixing, the cup was dried in an oven and the additives or fillers were dried over molecular sieves or with silica gel moisture-absorbing packets. This mixture was mixed for 4 minutes at 2250 rpm. The resulting mixture was then pressed into films having a thickness of 0.005 to 0.040 inches between release films, removed from the release films after the adhesive had hardened, and then allowed to cure for 3-7 days at 40-99% RH.

After curing, films were then weighed in air and water, immersed in deionized water for 7 days at 60° C., surface dried by rinsing in isopropanol alcohol and wiped dry, and weighed in air and water again. Immersion in water led to a mass gain of <2% and a volume swell of <5%.

Example 2

Similar formulations to those made by Example 1 above were processed into cured 0.02-0.040"-thick films, and then immersed in jet fuel, hydraulic oil, deicing fluid, and lubricating oil for 7 days at 60° C. After exposure to these fluids, cured films exhibited <5% mass gain and <8% volume swell. These films were also analyzed by tensile testing, differential scanning calorimetry (DSC), thermal gravimetric analysis (TGA), and dynamic mechanical analysis (DMA). Tensile testing showed >1000 psi tensile strength and >100% elongation at break. DSC showed an endotherm at 50° C. that corresponded to melting of the polyester segments, but no other transitions from −40 to 175° C. TGA showed <1% weight loss up to 175° C. DMA showed a significant decrease in modulus between 0 and 50° C. due to the polyester segments melting, but was otherwise mechanically robust up to 175° C.

Example 3

When applied in an uncured state to primed aluminum test specimens and allowed to cure for 3-7 days at 40-99% RH, similar formulations to those obtained by Example 1 also demonstrated >500 psi lap shear strength at room temperature.

Example 4

The uncured adhesive formulation in Example 1 was also mixed with 5-10 wt % carbon black and 1-5 wt % fumed silica. This obtained a low-slump RHM adhesive. After pressing into films and curing for 3-7 days at at 40-99% RH, this formulation also demonstrated similar fluid resistance and lap shear strength to primed aluminum specimens as the adhesive in Example 1.

Example 5

The uncured adhesive in Example 1 was also mixed with 40-50 wt % nickel flake. This obtained an adhesive, that when cured for 3-7 days at 40-99% RH, yielded moderate electrical conductivity and radio-frequency (RF) electromagnetic shielding properties.

Example 6

20 g of the uncured resin in Example 1 was mixed with 0.898 g of glycerol in Flakteck cup for 2 min and quickly pressed into a film. After curing for 48 h at room temperature, the resulting elastomeric film exhibited a sessile water contact angle of 95±3° and, when pulled on a tensile tester at 2 to 10 in/min, exhibited an ultimate tensile strength of 3200±300 psi, elongation-at-break of 135±10%, and Young's modulus of 7100±500 psi.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A reactive hot melt (RHM) composition comprising a mixture of:
   a urethane prepolymer which is a reaction product of (i) at least one crystallizable polyol, (ii) a perfluoropolyether polyol, and (iii) at least one isocyanate;
   a filler material; and
   a leachable plasticizer consisting of an aliphatic ester of a carboxylic acid, wherein
   the at least one isocyanate comprises a mixture of hexamethylene diisocyanate (HDI) trimer and methylenediphenyl diisocyanate (MDI) in about a 1:1 weight ratio.

2. The RHM composition as in claim 1, wherein the at least one crystallizable polyol is selected from the group consisting of polyester polyols, polyethylene copolymer polyols, polysiloxane polyols and acrylic polyols.

3. The RHM composition as in claim 1, further comprising at least one polyol selected from the group consisting of polyalkylene glycols, polysulfide polyols and silicone polyols.

4. The RHM composition as in claim 1, wherein the filler material is at least one fibrous or particulate filler selected from the group consisting of silica, carbon or metallic filler materials.

5. The RHM composition as in claim 4, wherein the filler material is at least one selected from the group consisting of nickel, iron, aluminum, tungsten, silver, gold, platinum, palladium and carbon materials.

6. The RHM composition as in claim 5, wherein the at least one filler material is present in an amount between about 0.1 wt. % to about 80 wt. %, based on total composition weight.

7. The RHM composition as in claim 1, wherein the leachable plasticizer consists of an aliphatic ester of citric acid, malonic acid and/or phthalic acid.

8. The RHM composition as in claim 7, wherein the leachable plasticizer is at least one selected from the group consisting of triethyl citrate, tributyl acetylcitrate and diethyl malonate.

9. The RHM composition as in claim 8, further comprising a non-ionic miscibilizer selected from the group consisting of ethylenediamine tetrakis(propoxylate-block-ethoxylate) tetrol (EDTP-b-ET) and poly(ethylene glycol) sorbitol hexaoleate (PEGSH).

10. The RHM composition as in claim 8, wherein the leachable plasticizer is present in an amount between about 1.0 wt. % to about 40 wt. %, based on total composition weight.

11. The RHM composition as in claim 1, further comprising between about 0.1 wt. % to about 80 wt. %, based on total composition weight, of at least one additive other than the filler material which is selected from the group consisting of density modifiers, dispersion additives, blocking agents, air reducing additives, antioxidants, flow improvers, conductivity modifiers and cure rate accelerators.

12. A substrate which is at least partially coated with the RHM composition of claim 1.

13. A method of forming a coating comprising applying the RHM composition of claim 1 onto a substrate at a melt temperature of the RHM, and allowing the RHM to cure on the substrate.

14. A method of making the reactive hot melt (RHM) composition according to claim 1, wherein the method comprises:
 (a) forming the urethane prepolymer by reacting (i) the at least one crystallizable polyol, (ii) the perfluoropolyether polyol, and (iii) the at least one isocyanate; and thereafter
 (b) mixing the urethane prepolymer with (1) the filler material and (2) the leachable plasticizer consisting of the aliphatic ester of a carboxylic acid.

15. A reactive hot melt (RHM) composition comprising a mixture of:
 (i) a urethane prepolymer which is a reaction product of (i) at least one crystallizable polyol, (ii) a perfluropolyether polyol, and (iii) at least one isocyanate;
 (ii) between about 0.1 wt. % to about 80 wt. %, based on total composition weight, of at least one filler material selected from the group consisting of nickel, iron, aluminum, tungsten, silver, gold, platinum, palladium and carbon materials;
 (iii) between about 1.0 wt. % to about 40 wt. %, based on total composition weight, of at least one leachable plasticizer selected from the group consisting of triethyl citrate, tributyl acetylcitrate and diethyl malonate; and
 (iv) a non-ionic miscibilizer selected from the group consisting of ethylenediamine tetrakis(propoxylate-block-ethoxylate) tetrol (EDTP-b-ET) and poly(ethylene glycol) sorbitol hexaoleate (PEGSH).

16. The RHM composition as in claim 15, wherein the at least one isocyanate comprises a mixture of hexamethylene diisocyanate (HDI) trimer and methylenediphenyl diisocyanate (MDI) in about a 1:1 weight ratio.

17. The RHM composition as in claim 15, wherein the at least one isocyanate is selected from the group consisting of hexamethylene diisocyanate (HDI), methylenediphenyl diisocyanate (MDI), tolulene diisocyanate (TDI), isophorone diisocyanate (IPDI) and hydrogenated methylenediphenyl diisocyanate (hMDI).

18. The RHM composition as in claim 15, further comprising between about 0.1 wt. % to about 80 wt. %, based on total composition weight, of at least one additive other than the filler material which is selected from the group consisting of density modifiers, dispersion additives, blocking agents, air reducing additives, antioxidants, flow improvers, conductivity modifiers and cure rate accelerators.

19. A substrate which is at least partially coated with the RHM composition of claim 15.

20. A method of forming a coating comprising applying the RHM composition of claim 15 onto a substrate at a melt temperature of the RHM, and allowing the RHM to cure on the substrate.

* * * * *